US012285123B1

(12) United States Patent
Jackson

(10) Patent No.: US 12,285,123 B1
(45) Date of Patent: Apr. 29, 2025

(54) PLATE WITH INTEGRATED HEATING SYSTEM

(71) Applicant: Larry Jackson, Johnstown, OH (US)

(72) Inventor: Larry Jackson, Johnstown, OH (US)

( * ) Notice: Subject to any disclaimer, the term of this patent is extended or adjusted under 35 U.S.C. 154(b) by 483 days.

(21) Appl. No.: 17/834,041

(22) Filed: Jun. 7, 2022

(51) Int. Cl.
*A47G 19/02* (2006.01)
*H05B 6/10* (2006.01)

(52) U.S. Cl.
CPC ............. *A47G 19/027* (2013.01); *H05B 6/10* (2013.01); *H05B 2213/07* (2013.01)

(58) Field of Classification Search
CPC ..... A47G 19/027; H05B 6/10; H05B 2213/07
USPC .......................................................... 219/385
See application file for complete search history.

(56) References Cited

U.S. PATENT DOCUMENTS 2,817,744 A 12/1957 Otis
7,193,190 B2 3/2007 Kissel, Jr.
D699,518 S 2/2014 Klimecki
9,801,482 B1 10/2017 Alexander
10,251,512 B2 4/2019 Nudo
2009/0194522 A1 8/2009 Connolly
2011/0056215 A1* 3/2011 Ham ...................... H01F 38/14 236/51
2015/0245723 A1* 9/2015 Alexander ............ A47J 39/025 219/387
2019/0110643 A1 4/2019 Contreras

FOREIGN PATENT DOCUMENTS

WO 2012061527 5/2012

* cited by examiner

*Primary Examiner* — Steven W Crabb
*Assistant Examiner* — Thomas J Ward
(74) *Attorney, Agent, or Firm* — Kyle A. Fletcher, Esq.

(57) ABSTRACT

The plate with integrated heating system is a crockery item. The plate with integrated heating system is adapted for use with a foodstuff. The plate with integrated heating system serves the foodstuff for consumption. The plate with integrated heating system is an electrically powered device. The plate with integrated heating system heats the foodstuff that is served on the plate with integrated heating system. The plate with integrated heating system comprises a plate, a pedestal, and a control circuit. The plate mounts on the pedestal. The control circuit is divided between the plate and the control circuit.

14 Claims, 4 Drawing Sheets

PLATE WITH INTEGRATED HEATING SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of plates with means for keeping food cool or hot. (A47G19/027)

SUMMARY OF INVENTION

The plate with integrated heating system is a crockery item. The plate with integrated heating system is adapted for use with a foodstuff. The plate with integrated heating system serves the foodstuff for consumption. The plate with integrated heating system is an electrically powered device. The plate with integrated heating system heats the foodstuff that is served on the plate with integrated heating system. The plate with integrated heating system comprises a plate, a pedestal, and a control circuit. The plate mounts on the pedestal. The control circuit is divided between the plate and the control circuit.

These together with additional objects, features and advantages of the plate with integrated heating system will be readily apparent to those of ordinary skill in the art upon reading the following detailed description of the presently preferred, but nonetheless illustrative, embodiments when taken in conjunction with the accompanying drawings.

In this respect, before explaining the current embodiments of the plate with integrated heating system in detail, it is to be understood that the plate with integrated heating system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the plate with integrated heating system.

It is therefore important that the claims be regarded as including such equivalent construction insofar as they do not depart from the spirit and scope of the plate with integrated heating system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention.

They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
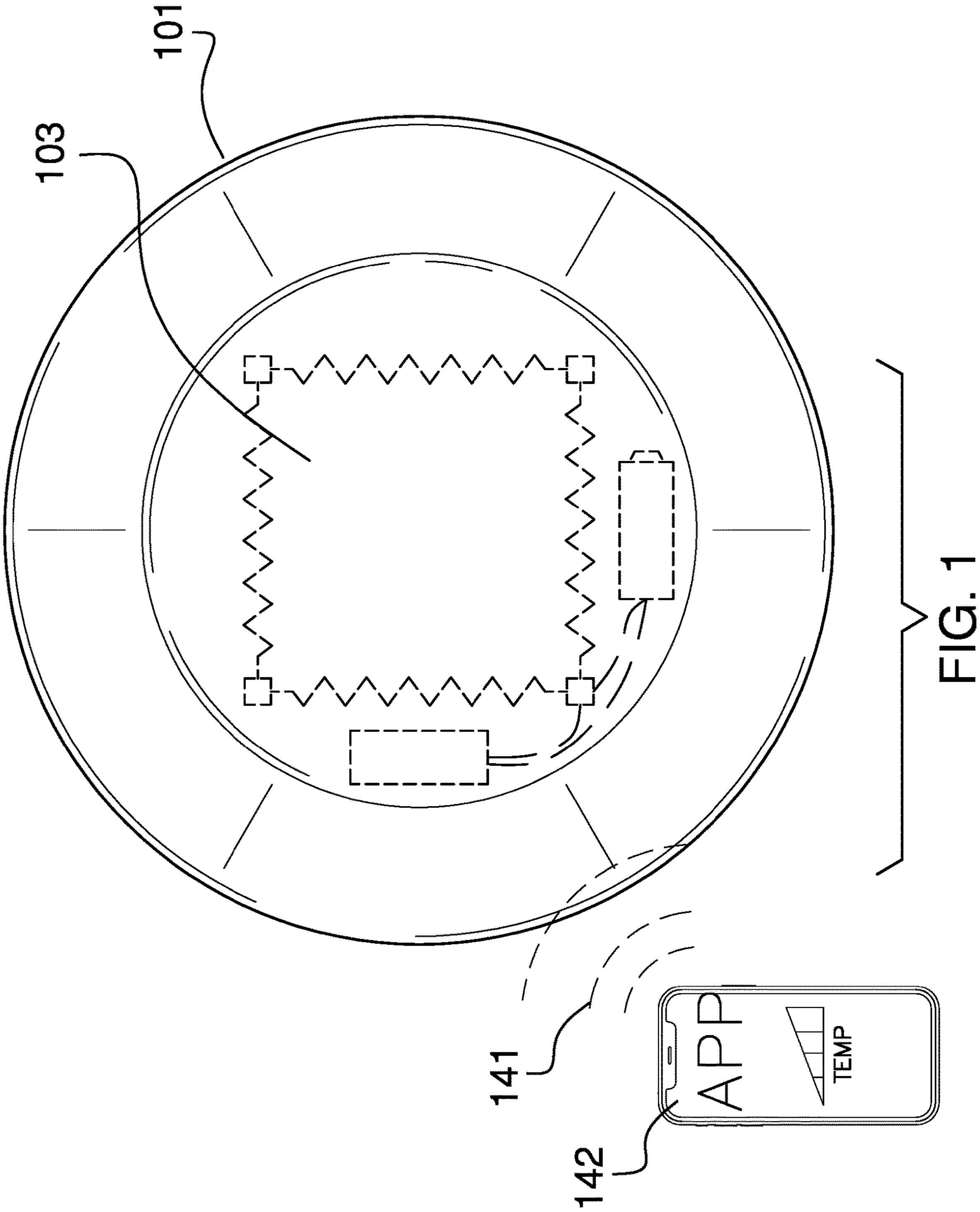
FIG. 1 is a top view of an embodiment of the disclosure.
Figure 2:
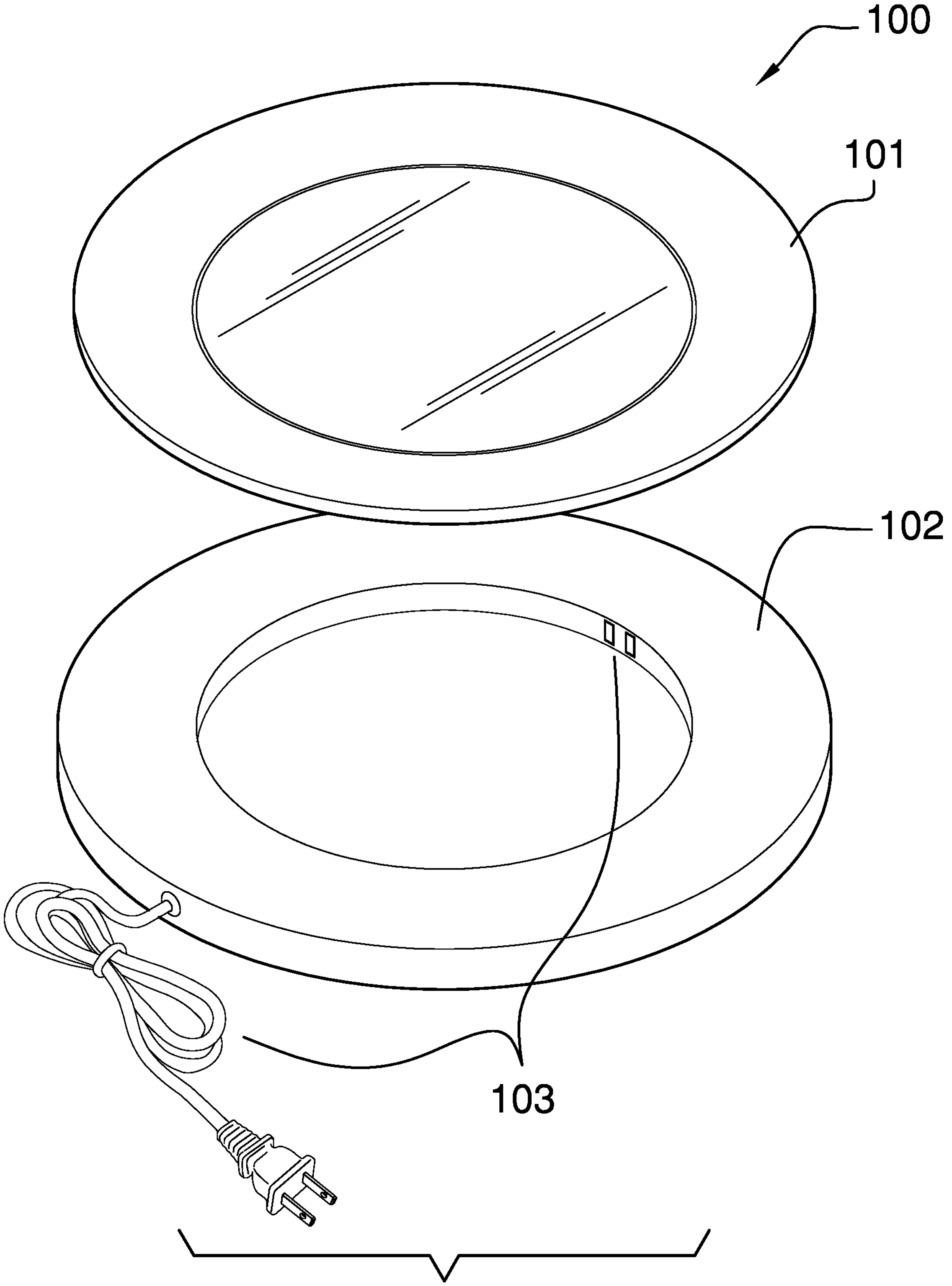
FIG. 2 is an exploded view of an embodiment of the disclosure.
Figure 3:
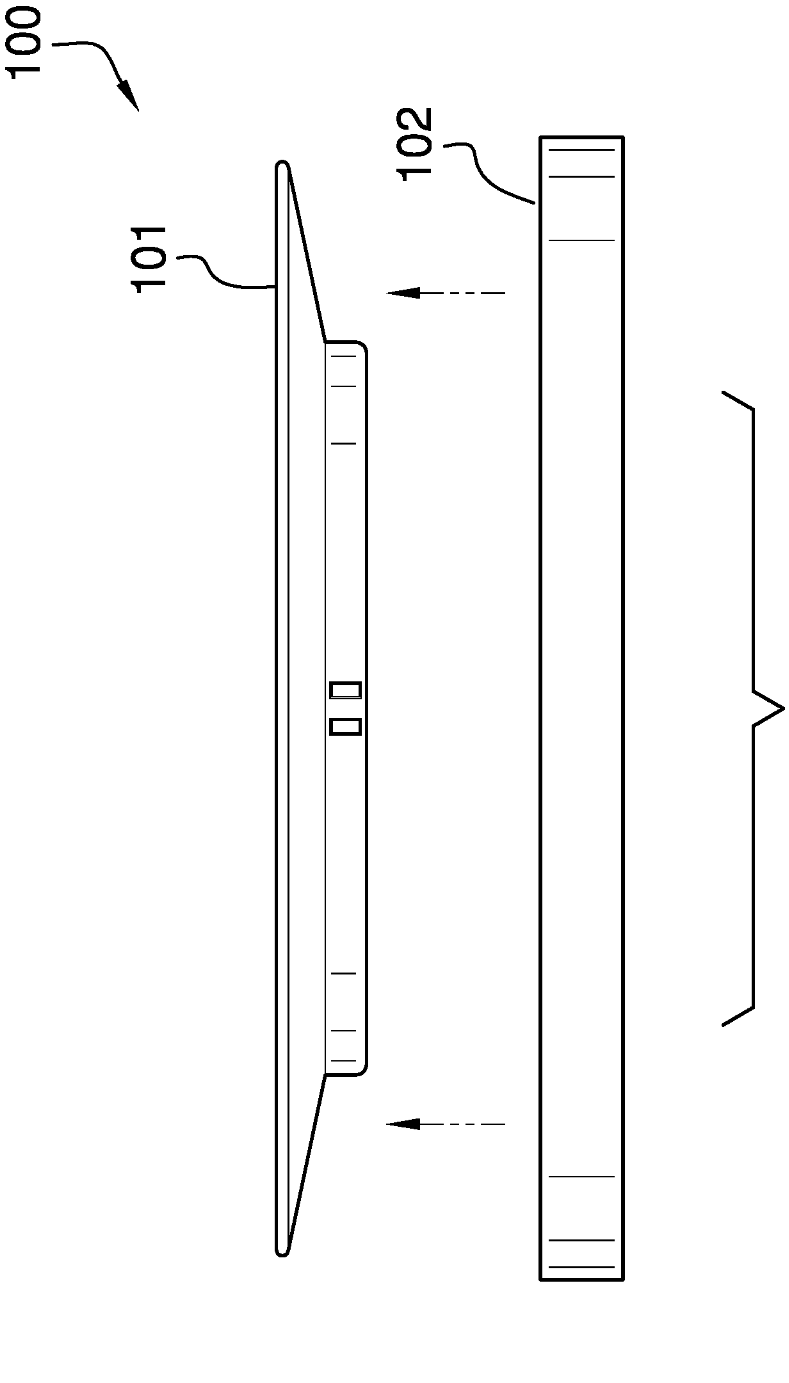
FIG. 3 is an exploded view of an embodiment of the disclosure.
Figure 4:
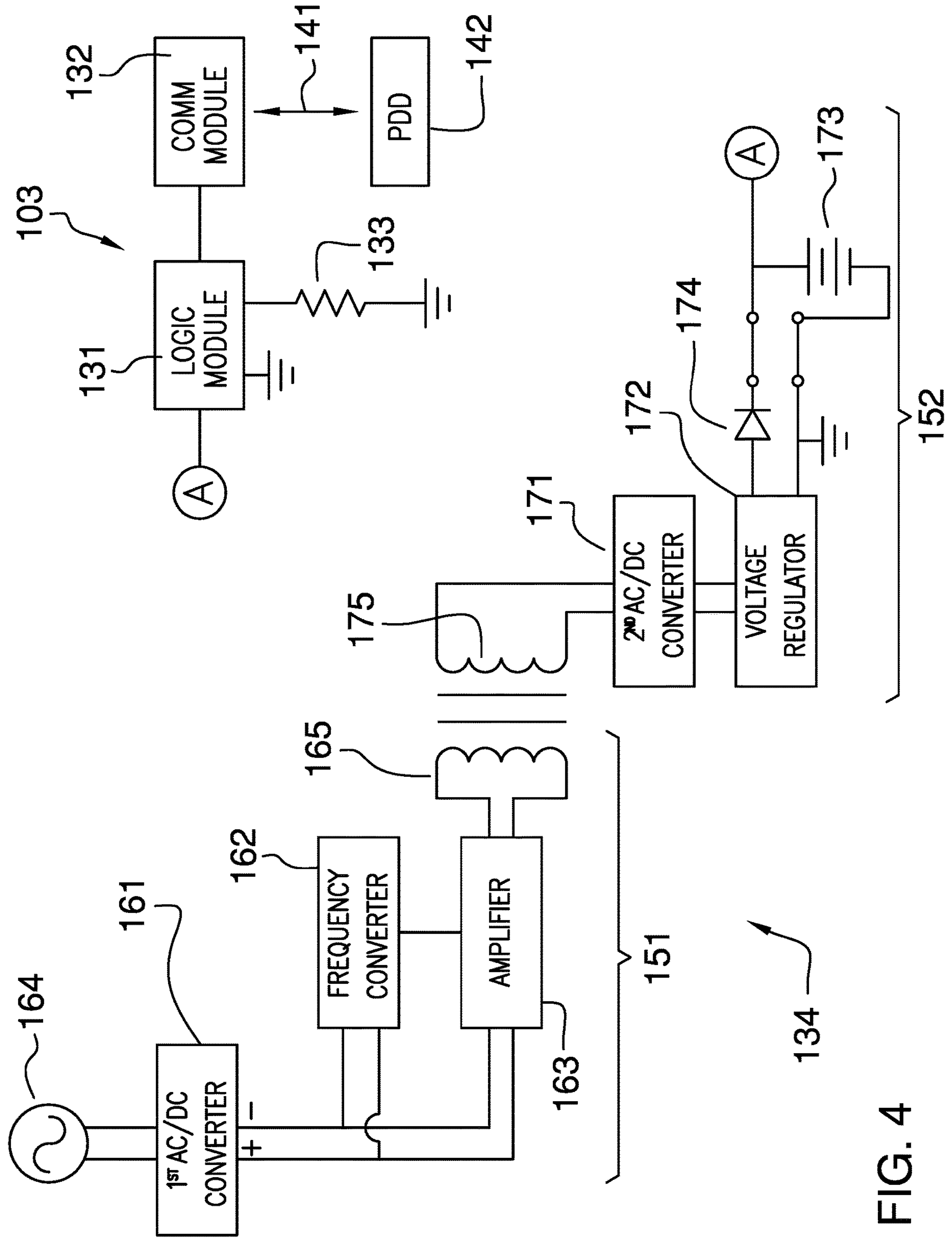
FIG. 4 is a schematic view of an embodiment of the disclosure.

Detailed reference will now be made to one or more potential embodiments of the disclosure, which are illustrated in FIGS. 1 through 4.

The plate with integrated heating system 100 (hereinafter invention) is a crockery item. The invention 100 is adapted for use with a foodstuff. The invention 100 serves the foodstuff for consumption. The invention 100 is an electrically powered device. The invention 100 heats the foodstuff that is served on the invention 100. The invention 100 comprises a plate 101, a pedestal 102, and a control circuit 103. The plate 101 mounts on the pedestal 102. The control circuit 103 is divided between the plate 101 and the control circuit 103.

The plate 101 is an item of crockery. The plate 101 is a roughly disk shaped structure. The plate 101 forms a horizontally oriented surface. The plate 101 forms a platform on which the foodstuff is placed. The plate 101 contains a portion of the control circuit 103. The plate 101 transfers the heat generated by the control circuit 103 to the foodstuff resting on the plate 101. The plate 101 rests on the pedestal 102.

The pedestal 102 is a load bearing structure. The pedestal forms a load path that transfers the load of the plate 101 to a supporting surface such as a table. The pedestal 102 elevates the plate 101 above the supporting surface. The pedestal 102 is a disk shaped structure. The pedestal 102 has a ring shape. The pedestal 102 contains a portion of the control circuit 103. The pedestal 102 portion of the control circuit 103 generates radio frequency energy that is transmitted to the portion of the control circuit 103 that is contained in the plate 101. The plate 101 uses the received radio frequency energy to power the operation of the portion of the control circuit 103 that is contained in the plate 101.

The control circuit 103 is an electric circuit. The control circuit 103 is an inductive circuit. The control circuit 103 receives electric energy from a national electric grid 164.

The control circuit 103 converts the received 19 electric energy into chemical potential energy. The control circuit 103 subsequently converts the stored chemical potential energy into electric energy that is used to generate heat. The heat generated by the control circuit 103 is used to heat the plate 101. The control circuit 103 is an independently powered electric circuit. By independently powered is meant that the control circuit 103 can operate without an electrical connection to the national electric grid 164. The control circuit 103 comprises a logic module 131, a communication module 132, a heating element 133, and a wireless power circuit 134. The logic module 131, the communication module 132, the heating element 133, and the wireless power circuit 134 are electrically interconnected.

The logic module 131 is a readily and commercially available programmable electronic device that is used to manage, regulate, and operate the control circuit 103. The communication module 132 is a wireless electronic communication device that allows the logic module 131 to wirelessly communicate with a personal data device 142. The communication module 132 further comprises a wireless communication link 141 and a personal data device 142. The communication module 132 establishes the wireless communication link 141 between the personal data device 142 and the control circuit 103.

Specifically, the communication module 132 establishes a wireless communication link 141 between the control circuit 103 and the personal data device 142. In the first potential embodiment of the disclosure the communication module 132 supports a communication protocol selected from the group consisting of a WiFi™ protocol or a Bluetooth™ protocol.

The personal data device 142 is a programmable electrical device. The personal data device 142 further comprises an application. The personal data device 142 provides data management and communication services through one or more functions referred to as an application. The application is a set of logical operating instructions that are performed by the personal data device 142. The addition of an application will provide increased functionality for the personal data device 142. This disclosure assumes that an application exists for the purpose of interacting with the invention 100. Methods to design and implement an application on a personal data device 142 are well known and documented in the electrical arts. The application of the personal data device 142 forms an interface between the control circuit 103 and the wireless power circuit 134. The personal data device 142 transmits operating instructions over the wireless communication link 141 to the control circuit 103. The communication module 132 receives the transmitted operating instructions and relays the received operating instructions to the logic module 131. The transmitted operating instruction causes the logic module 131 to take an action selected from the group consisting of: a) provide the heating element 133 with the electric energy necessary to allow the heating element 133 to generate heat; and, b) discontinuing the flow of electric energy into the heating element 133.

The heating element 133 is an electric device. The heating element 133 converts electric energy into heat. The heat generated by the heating element 133 warms the plate 101 and the foodstuff that rests on the plate 101. The heating element 133 electrically connects to the logic module 131. The logic module 131 controls the flow of electricity into the heating element 133.

The wireless power circuit 134 is an electrical circuit. The wireless power circuit 134 powers the operation of the control circuit 103. The wireless power circuit 134 is an electrochemical device. The wireless power circuit 134 converts chemical potential energy into the electrical energy required to power the control circuit 103. The wireless power circuit 134: a) draws AC electrical energy from a national electric grid 164; and, b) wirelessly broadcasts the AC electrical energy received from the national electric grid 164 to the induction circuit 152. The wireless power circuit 134 comprises an energy broadcast circuit 151 and an induction circuit 152. The energy broadcast circuit 151 and the induction circuit 152 are inductively coupled. The energy broadcast circuit 151 mounts in the pedestal 102. The induction circuit 152 mounts in the plate 101.

The energy broadcast circuit 151 broadcasts the AC electrical energy received from the national electric grid 164 to the induction circuit 152. The induction circuit 152 electrically connects to and provides electrical energy to an electric circuit. The induction circuit 152: a) receives the AC electrical energy broadcast from the energy broadcast circuit 151; b) converts the received AC electrical energy into DC electrical energy suitable for use by the control circuit 103 associated with the selected induction circuit 152; and, c) transfers the DC electrical energy to a battery 173.

The energy broadcast circuit 151 is an electrical circuit. The energy broadcast circuit 151 draws AC electrical energy from the national electric grid 164. The energy broadcast circuit 151 processes the AC electrical energy for broadcast. The energy broadcast circuit 151 broadcasts the processed AC electrical energy to the induction circuit 152. The energy broadcast circuit 151 comprises a first AC/DC converter 161, a frequency generating circuit 162, a first amplifier 163, a broadcast antenna 165, and a national electric grid 164. The first AC/DC converter 161, the frequency generating circuit 162, the first amplifier 163, the broadcast antenna 165, and the national electric grid 164 are electrically interconnected.

The first AC/DC converter 161 is an AC/DC converter. The first AC/DC converter 161 electrically connects to the national electric grid 164. The first AC/DC converter 161 receives AC electrical energy from the national electric grid 164 and converts the AC electrical energy into a regulated DC voltage.

The frequency generating circuit 162 is an electrical circuit. The frequency generating circuit 162 is an oscillating circuit that receives DC electrical energy from the DC regulated voltage provided by the first AC/DC converter 161. The frequency generating circuit 162 generates an AC electrical voltage at the broadcast frequency of the energy broadcast circuit 151.

The first amplifier 163 is an electrical circuit. The first amplifier 163 is a power amplifier. The first amplifier 163 receives as an input the AC voltage generated by the frequency generating circuit 162 and amplifies the received AC electrical voltage such that the signal broadcast by the energy broadcast circuit 151 contains sufficient energy to broadcast electrical energy for use by the induction circuit 152.

The broadcast antenna 165 is an electrical device. The broadcast antenna 165 receives the amplified AC electrical energy from the first amplifier 163 and broadcasts the amplified AC electrical energy as electromagnetic radiation to the induction circuit 152.

The national electric grid 164 is source of the electrical energy required to operate the wireless power circuit 134. The national electric grid 164 is defined elsewhere in this disclosure.

The design and use of an AC/DC converter, a frequency generating circuit 162, the first amplifier 163, and the broadcast antenna 165 are well-known and documented in the electrical arts.

The induction circuit 152 is an electrical circuit. The induction circuit 152 comprises a battery 173, an induction antenna 175, a second AC/DC converter 171, and a voltage regulator 172. The battery 173, the induction antenna 175, the second AC/DC converter 171, and the voltage regulator 172 are electrically interconnected. The induction circuit 152 receives the AC electrical energy broadcast from the energy broadcast circuit 151 and processes the received AC electrical energy into a regulated DC voltage that recharges the battery 173 with DC electrical energy.

The induction antenna 175 is an electrical device. The induction antenna 175 receives the electromagnetic radiation generated by the energy broadcast circuit 151 and converts the received electromagnetic radiation into AC electrical energy. The induction antenna 175 electrically connects the received AC electrical energy to the second AC/DC converter 171 for processing.

The second AC/DC converter 171 is an AC/DC converter. The second AC/DC converter 171 electrically connects to the induction antenna 175. The second AC/DC converter 171 receives AC electrical energy from the induction antenna 175 and converts the AC electrical energy into a source of DC electrical energy with an unregulated DC voltage.

The voltage regulator 172 is an electrical circuit. The voltage regulator 172 converts the unregulated DC electrical energy received from the second AC/DC converter 171 into a regulated DC voltage source that provides regulated DC electrical energy to the battery 173. The battery 173 is an electrochemical device. The battery 173 converts chemical potential energy into the electrical energy used to power the control circuit 103. The diode 174 is an electrical device that limits the flow of electricity to one direction. The diode 174 installs between the battery 173 and the voltage regulator 172 such that electricity will not back flow from the battery 173 into the voltage regulator 172.

The following definitions were used in this disclosure:

AC: As used in this disclosure, AC is an acronym for alternating current.

AC/DC Converter: As used in this disclosure, an AC/DC converter is an electrical device that converts an AC voltage into a regulated DC voltage by rectifying and regulating the AC voltage. Method to design and build AC/DC converters are well known in the electrical arts. The AC/DC converter is further defined with a positive terminal, a negative terminal, and a power input.

Amplifier: As used in this disclosure, an amplifier refers to an electronic component that increases the voltage, current, or power of an input signal. Specifically, within this disclosure, an amplifier refers to a differential amplifier. A differential amplifier is a device with two inputs with a single output. A differential amplifier amplifies the voltage difference between the two inputs. The gain of an amplifier is defined as the ratio of the output to the input as measured in a set of units selected from the group consisting of electric voltage, electric current, and electric power. Electric voltage is the most commonly selected unit.

Antenna: As used in this disclosure, an antenna is an electrical apparatus used to: a) convert electrical current into electromagnetic radiation; and, b) convert electromagnetic radiation into electrical current. An antenna is a type of transducer.

Application or App: As used in this disclosure, an application or app is a self-contained piece of software that is especially designed or downloaded for use with a personal data device.

Battery: As used in this disclosure, a battery is a chemical device consisting of one or more cells, in which chemical energy is converted into electricity and used as a source of power. Batteries are commonly defined with a positive terminal and a negative terminal.

Bluetooth™: As used in this disclosure, Bluetooth™ is a standardized communication protocol that is used to wirelessly interconnect electronic devices.

Communication Link: As used in this disclosure, a communication link refers to the structured exchange of data between two objects.

Control Circuit: As used in this disclosure, a control circuit is an electrical circuit that manages and regulates the behavior or operation of a device.

Crockery: As used in this disclosure, crockery is a general term that refers to plates, bowls, cups and other vessels that are used in the serving of food and beverages. As used in this disclosure, the term crockery includes vessels such as the cups, glasses or bottles used for the consumption of beverages. As used in this disclosure, the term crockery excludes cutlery.

DC: As used in this disclosure, DC is an acronym for direct current.

Diode: As used in this disclosure, a diode is a two terminal semiconductor device that allows current flow in only one direction. The two terminals are called the anode and the cathode. Electric current is allowed to pass from the anode to the cathode.

External Power Source: As used in this disclosure, an external power source is a source of the energy that is externally provided to enable the operation of the present disclosure. Examples of external power sources include, but are not limited to, electrical power sources and compressed air sources.

Heat: As used in this disclosure, heat refers to a transfer of energy between a first object and a second object such that the temperatures of the first object and the second object of one or both of the objects changes. In common usage, heat is said to flow from the warmer object to the cooler object. In systems where the combined energies of the first object and the second object remain constant, the equilibrium temperatures of the first object and the second object will be equal. The verb to heat is taken to mean the act of adding energy to the first object such that the temperature of the first object increases relative to a second object.

Heating Element: As used in this disclosure, a heating element is a resistive wire that is used to convert electrical energy into heat. Common metal combinations used to form heat elements include a combination of nickel and Chromium (typical: 80/20), a combination of iron, chromium, and aluminum (typical 70/25/5), a combination of copper, nickel, iron, and manganese (typical 66/30/2/2) (use for continuously hot), and platinum.

Induction: As used in this disclosure, induction refers to a process where a first process selected from the group consisting of an electric current or an electromagnetic field generates or interacts with a second process selected from the group consisting of an electric current or an electromagnetic field.

Inductive Charging Device: As used in this disclosure, an inductive charging device is an electrical device. The inductive charging device transfers energy from a first electric device to a second electric device. The first electric device transfers electric energy to the second electric device using induction.

Induction Circuit: As used in this disclosure, an induction circuit is a first electric circuit, or sub-circuit, that is inductively coupled with a second electric circuit.

Logic Module: As used in this disclosure, a logic module is a readily and commercially available electrical device that accepts digital and analog inputs, processes the digital and analog inputs according to previously specified logical processes and provides the results of these previously specified logical processes as digital or analog outputs. The disclosure allows, but does not assume, that the logic module is programmable.

Loop: As used in this disclosure, a loop is the length of a first linear structure including, but not limited to, shafts, lines, cords, or webbings, that is: 1) folded over and joined at the ends forming an enclosed space; or, 2) curved to form a closed or nearly closed space within the first linear structure. In both cases, the space formed within the first linear structure is such that a second linear structure such as a line, cord or a hook can be inserted through the space formed within the first linear structure. Within this disclosure, the first linear structure is said to be looped around the second linear structure.

National Electric Grid: As used in this disclosure, the national electric grid is a synchronized and highly interconnected electrical network that distributes energy in the form of electric power from a plurality of generating stations to consumers of electricity. The national electric grid is a commercially available source of AC electrical power. The national electric grid is regulated by an appropriate authority. The national electric grid comprises one or more utilities that sell electrical power for use by an electrical load. The national electric grid invoices for electrical power based on the total energy consumed by the electrical load. The national electric grid measures the energy consumption of an electrical load with an electrical meter. The national electric grid provides power through electrical connections known as a hot lead and a neutral lead.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

PDD: As used in this disclosure, PDD is an acronym for personal data device.

Pedestal: As used in this disclosure, a pedestal is an intermediary load bearing structure that forms a load path between a supporting surface and an object, structure, or load.

Personal Data Device: As used in this disclosure, a personal data device is a handheld logical device that is used for managing personal information and communication. Examples of personal data device include, but are not limited to, cellular phones, tablets, and smartphones.

Plate: As used in this disclosure, a plate is a shallow concave crockery item. The superior surface of the plate presents a concave surface. The concave surface contains fluids associated with a foodstuff. By shallow is meant that the span of the vertical depth from the apex of the concave surface to the superior edge of the concave surface is such that foodstuffs contained in the plate can be cut from a horizontal angle of attack.

Plug: As used in this disclosure, a plug is an electrical termination that electrically connects a first electrical circuit to a second electrical circuit or a source of electricity. As used in this disclosure, a plug will have two or three metal pins.

Port: As used in this disclosure, a port is an electrical termination that is used to connect a first electrical circuit to a second external electrical circuit. In this disclosure, the port is designed to receive a plug.

Ring: As used in this disclosure, a ring is term that is used to describe a disk-like structure through which a negative space is formed through the faces of the disk-like structure. Rings are often considered loops.

Roughly: As used in this disclosure, roughly refers to a comparison between two objects. Roughly means that the difference between one or more parameters of the two compared objects are not significantly different.

USB: As used in this disclosure, USB is an acronym for Universal Serial Bus which is an industry standard that defines the cables, the connectors, the communication protocols, and the distribution of power required for interconnections between electronic devices. The USB standard defines several connectors including, but not limited to, USB-A, USB-B, mini-USB, and micro USB connectors. A USB cable refers to a cable that: 1) is terminated with USB connectors; and, 2) meets the data transmission standards of the USB standard.

Voltage Regulator: As used in this disclosure, a voltage regulator refers to an electrical circuit that takes unregulated voltage as its power input and provides a constant output voltage independent of variations to input power supply voltage or output, load, or current.

WiFi™: As used in this disclosure, WiFi™ refers to the physical implementation of a collection of wireless electronic communication standards commonly referred to as IEEE 802.11x.

Wireless: As used in this disclosure, wireless is an adjective that is used to describe a communication link between two devices that does not require the use of physical cabling.

Wireless Communication Establishment Technology: As used in this disclosure, a wireless communication establishment technology refers to technology that establishes a wireless communication link between a first logical device and a second logical device. Usually, the operation of a wireless communication establishment technology is initiated by the push of a button. An example of such a technology is the WiFi™ protected setup technology (WPS™).

With respect to the above description, it is to be realized that the optimum dimensional relationship for the various components of the invention described above and in FIGS. 1 through 4 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A plate with integrated heating system comprising a plate, a pedestal, and a control circuit;
wherein the plate mounts on the pedestal;
wherein the control circuit is divided between the plate and the control circuit;
wherein the control circuit comprises a logic member, a communication module, a heating element, and a wireless power circuit;
wherein the wireless power circuit comprises an energy broadcast circuit and an induction circuit;
wherein the wireless power circuit: a) draws ac electrical energy from the national electric grid; and, b) wirelessly broadcasts the ac electrical energy received from the national electric grid to the induction circuit;
wherein the energy broadcast circuit comprises a first ac/dc converter, a frequency generating circuit, a first amplifier, and a broadcast antenna;
wherein the first ac/dc converter electrically connects to the national electric grid;
wherein the first ac/dc converter receives ac electrical energy from the national electric grid and converts the ac electrical energy into a regulated dc voltage;
wherein the frequency generating circuit is an oscillating circuit that receives dc electrical energy from the dc regulated voltage provided by the first ac/dc converter;
wherein the frequency generating circuit generates an ac electrical voltage at the broadcast frequency of the energy broadcast circuit.

2. The plate with integrated heating system according to claim 1
wherein the plate with integrated heating system is a crockery item;
wherein the plate with integrated heating system is an electrically powered device.

3. The plate with integrated heating system according to claim 2
wherein the plate is a roughly disk shaped structure;
wherein the plate forms a horizontally oriented surface;
wherein the plate contains a portion of the control circuit;
wherein the plate rests on the pedestal.

4. The plate with integrated heating system according to claim 3
wherein the pedestal is a load bearing structure;
wherein the pedestal forms a load path that transfers the load of the plate to a supporting surface;
wherein the pedestal elevates the plate above the supporting surface;
wherein the pedestal is a disk shaped structure;
wherein the pedestal has a ring shape;
wherein the pedestal contains a portion of the control circuit.

5. The plate with integrated heating system according to claim 4
wherein the pedestal portion of the control circuit generates radio frequency energy that is transmitted to the portion of the control circuit that is contained in the plate;
wherein the plate uses the received radio frequency energy to power the operation of the portion of the control circuit that is contained in the plate.

6. The plate with integrated heating system according to claim 5
the control circuit is an electric circuit;
wherein the control circuit receives electric energy from a national electric grid;
wherein the control circuit converts the received electric energy into chemical potential energy;
wherein the control circuit subsequently converts the stored chemical potential energy into electric energy that is used to generate heat;
wherein the heat generated by the control circuit is used to heat the plate;
wherein the control circuit is an independently powered electric circuit;
wherein by independently powered is meant that the control circuit can operate without an electrical connection to the national electric grid.

7. The plate with integrated heating system according to claim 6
wherein the logic member, the communication module, the heating element, and the wireless power circuit are electrically interconnected,
wherein the communication module further comprises a wireless communication link and a personal data device;
wherein the communication module establishes the wireless communication link between the personal data device and the control circuit;
wherein specifically, the communication module establishes a wireless communication link between the control circuit and the personal data device.

8. The plate with integrated heating system according to claim 7 wherein the communication module receives the transmitted operating instructions and relays the received operating instructions to the logic member;
wherein the transmitted operating instruction causes the logic member to take an action selected from the group consisting of: a) provide the heating element with the electric energy necessary to allow the heating element to generate heat; and, b) discontinuing the flow of electric energy into the heating element.

9. The plate with integrated heating system according to claim 8
wherein the heating element is an electric device;
wherein the heating element converts electric energy into heat;
wherein the heat generated by the heating element warms the plate;
wherein the heating element electrically connects to the logic member;
wherein the logic member controls the flow of electricity into the heating element.

10. The plate with integrated heating system according to claim 9
wherein the wireless power circuit is an electrical circuit;
wherein the wireless power circuit powers the operation of the control circuit;
wherein the wireless power circuit is an electrochemical device;
wherein the wireless power circuit converts chemical potential energy into the electrical energy required to power the control circuit.

11. The plate with integrated heating system according to claim 10
wherein the energy broadcast circuit and the induction circuit are inductively coupled;
wherein the energy broadcast circuit broadcasts the ac electrical energy received from the national electric grid to the induction circuit;

wherein the induction circuit electrically connects to and provides electrical energy to an electric circuit;

wherein the induction circuit: a) receives the ac electrical energy broadcast from the energy broadcast circuit; b) converts the received ac electrical energy into dc electrical energy suitable for use by the control circuit associated with the selected induction circuit; and, c) transfers the dc electrical energy to a battery.

12. The plate with integrated heating system according to claim 11 wherein the energy broadcast circuit is an electrical circuit;

wherein the energy broadcast circuit draws ac electrical energy from the national electric grid;

wherein the energy broadcast circuit processes the ac electrical energy for broadcast;

wherein the energy broadcast circuit broadcasts the processed ac electrical energy to the induction circuit.

13. The plate with integrated heating system according to claim 12 wherein the first ac/dc converter, the frequency generating circuit, the first amplifier, the broadcast antenna, and the national electric grid are electrically interconnected;

wherein the first ac/dc converter is an ac/dc converter;

wherein the frequency generating circuit is an electrical circuit;

wherein the first amplifier is an electrical circuit;

wherein the first amplifier is a power amplifier;

wherein the first amplifier receives as an input the ac voltage generated by the frequency generating circuit and amplifies the received ac electrical voltage such that the signal broadcast by the energy broadcast circuit contains sufficient energy to broadcast electrical energy for use by the induction circuit;

wherein the broadcast antenna is an electrical device;

wherein the broadcast antenna receives the amplified ac electrical energy from the first amplifier and broadcasts the amplified ac electrical energy as electromagnetic radiation to the induction circuit;

wherein the national electric grid is the source of the electrical energy required to operate the wireless power circuit.

14. The plate with integrated heating system according to claim 13 wherein the induction circuit is an electrical circuit;

wherein the induction circuit comprises the battery, an induction antenna, a second ac/dc converter, and a voltage regulator;

wherein the battery, the induction antenna, the second ac/dc converter, and the voltage regulator are electrically interconnected;

wherein the induction circuit receives the ac electrical energy broadcast from the energy broadcast circuit and processes the received ac electrical energy into a regulated dc voltage that recharges the battery with dc electrical energy;

wherein the induction antenna is an electrical device;

wherein the induction antenna receives the electromagnetic radiation generated by the energy broadcast circuit and converts the received electromagnetic radiation into ac electrical energy;

wherein the induction antenna electrically connects the received ac electrical energy to the second ac/dc converter for processing;

wherein the second ac/dc converter is an ac/dc converter;

wherein the second ac/dc converter electrically connects to the induction antenna;

wherein the second ac/dc converter receives ac electrical energy from the induction antenna and converts the ac electrical energy into a source of dc electrical energy with an unregulated dc voltage;

wherein the voltage regulator is an electrical circuit;

wherein the voltage regulator converts the unregulated dc electrical energy received from the second ac/dc converter into a regulated dc voltage source that provides regulated dc electrical energy to the battery;

wherein the battery is an electrochemical device;

wherein the battery converts chemical potential energy into the electrical energy used to power the control circuit;

wherein the diode is an electrical device that limits the flow of electricity to one direction;

wherein the diode installs between the battery and the voltage regulator such that electricity will not back flow from the battery into the voltage regulator.

* * * * *